Jan. 13, 1970   J. D. KIRSCHMANN   3,489,321
FEEDING MECHANISM FOR SEED
Filed March 30, 1966   2 Sheets-Sheet 1

INVENTOR.
JOHN D. KIRSCHMANN
BY Williamson, Palmatier
& Bains
ATTORNEYS

John D. Kirschmann
INVENTOR

United States Patent Office 3,489,321
Patented Jan. 13, 1970

3,489,321
FEEDING MECHANISM FOR SEED
John D. Kirschmann, % Kirschmann Manufacturing and Distributing, 323 Airport Road, Bismarck, N. Dak. 58501
Filed Mar. 30, 1966, Ser. No. 538,846
Int. Cl. B67d 5/62; G01f 11/00
U.S. Cl. 222—268                                    4 Claims

ABSTRACT OF THE DISCLOSURE

Apparatus for evenly distributing seed from a seed or grain hopper of a planting machine comprising a plurality of guide cups disposed under spaced apart discharge apertures in the bottom of the seed hopper, the guide cups being contoured to house rotatably supported metering wheels and cooperating therewith to form outwardly converging seed metering passages through which seeds are conveyed by transverse pockets formed in the periphery of the metering wheels. The metering wheels are mounted on a drive shaft which is adjustable relative to curved bottom portions of the guide cups, whereby the size of the seed metering passageway between the periphery of the metering wheels and said curved bottom portions may be varied to accommodate different sizes of seeds.

---

This invention is directed to apparatus for uniformly distributing granular material such as seeds or fertilizer from a hopper onto the ground. Certain types of seeds and fertilizers, in particular hybrid seeds, must be planted or sowed in an even pattern at uniform intervals in each row or furrow as well as in adjacent rows in order to maintain maximum harvest yields.

This basic objective has been achieved by distribution apparatus particularly characterized by a rotating feed wheel which has a plurality of seed-conveying pockets spaced around its periphery and which cooperates with a curved bottom wall of a guide cup positioned under an aperture in a hopper to define therebetween a converging seed metering passage which terminates in a discharge lip positioned above the bottom of the guide cup.

As a particularly beneficial feature of my invention, the feed wheels are removably mounted on a drive shaft whereby different types of feed wheels having different sizes of seed-conveying pockets may be mounted on the shaft so as to insure the attainment of the desired distribution pattern and feed rate of a particular size and shape of seed or other granular material which is being distributed onto the ground.

A further advantage of my improved distributing apparatus resides in the adjustable mounting of the feed wheel drive shaft so as to permit the movement of the feed wheels mounted thereon relative to the bottom wall of the seed guide cup, thereby adjusting the size of the metering passage formed therebetween for the particular type and size of seed that is being planted.

These and other objects and advantages of my invention will become readily apparent as the following description is read in conjunction with the accompanying drawings wherein like reference numerals have been used to refer to like elements throughout the several views.

Figures 7, 8, 9:
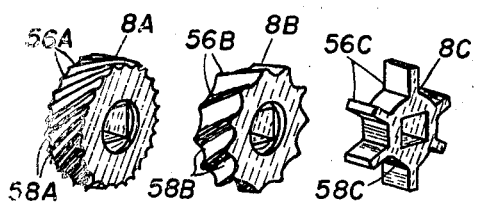

FIGURES 7, 8, and 9 are perspective views of three types of seed metering wheels which could be used in the distributing apparatus of this invention.

Figure 1:
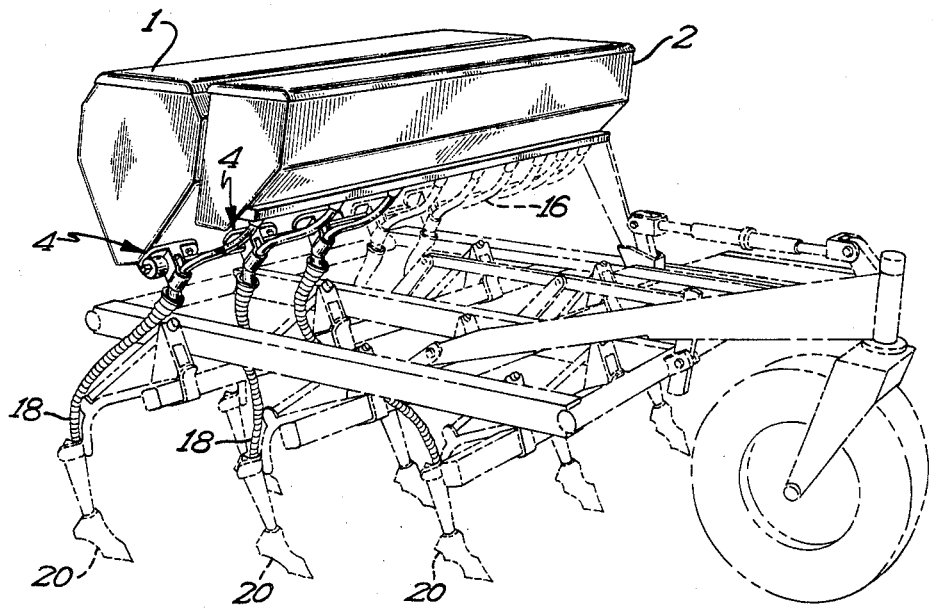
FIGURE 1 is a perspective view showing the manner in which my improved seed distributing apparatus may be attached to the hopper of a planting machine.
Figure 2:
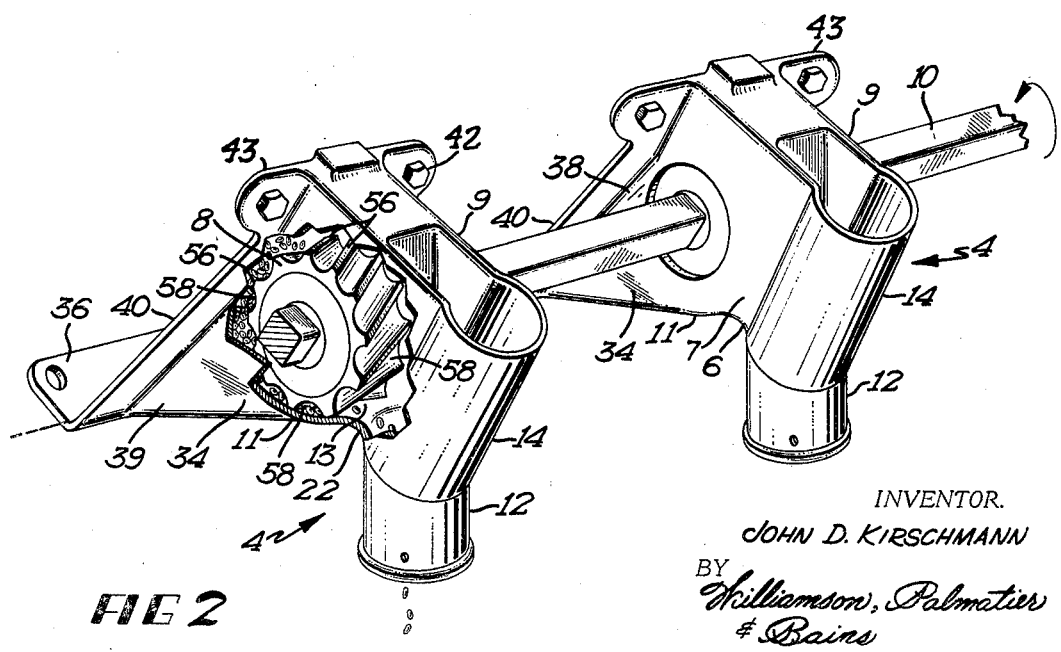
FIGURE 2 is a perspective view of the guide cup and metering wheel assemblies, the wall of one of the guide cups being broken away to show a metering wheel mounted on a drive shaft within the guide cup.

The metering apparatus of my invention may be utilized with any suitable means for containing seed, fertilizer or other granular material. An example of such apparatus is illustrated in FIGURE 1 wherein a seed hopper 1 and a fertilizer hopper 2 are shown mounted on a planting machine which is commonly known as a grain drill. A plurality of my improved metering and distributing devices 4 are shown attached to the bottom of seed hopper 1, each metering assembly 4 being comprised of a guide cup 6 within which a feed wheel 8 is rotatably supported on a drive shaft 10 in the arrangement shown in FIGURE 2. Each of the guide cups 6 includes a downwardly directed discharge spout 12 and an upwardly extending tubular extension 14 which is connected to the bottom of hopper 2 by one of the flexible conduits 16. Fertilizer or other granular material for expediting seed germination and preventing plane diseases may thus be introduced from hopper 2 through conduit 16 and tubular extension 14 into discharge spout 12 and mixed with the seeds being fed into spout 12 by rotating metering wheels 8. Another set of flexible conduits 18 connects the discharge spout 12 with furrowing hoes 20 to distribute the seed or the seed and fertilizer mixture into the adjacent rows over furrows formed by hoes 20. The spacing of furrowing hoes 20, and of metering assemblies 4 connected thereto will be dictated by the required row spacing for the seed being planted. Seed metering assemblies 4 could of course be used in combination with the well-known, disc-type furrow opener as well as with the hoe type of furrowing tool shown at 20 in FIGURE 1.

Figure 4:
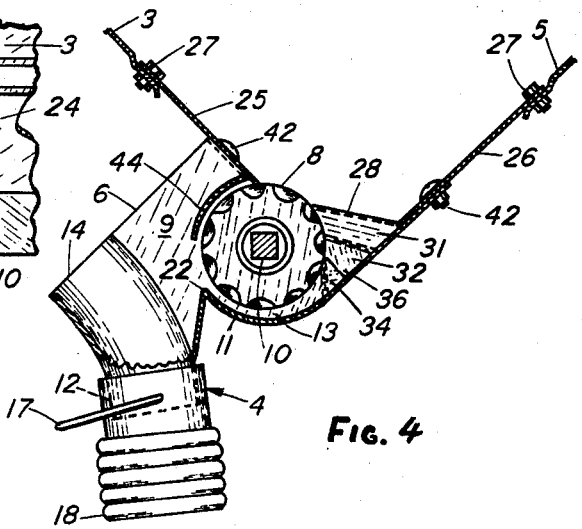
FIGURE 4 is a vertical section view taken along lines 4—4 of FIGURE 3.

Seed wheels 8 are contained between planar side walls 7 and 9 of guide cups 6, the lower ends of side walls 7 and 9 terminating in curvilinear portions which define tubular extension 14. Curved bottom wall 11 of cups 6 serves as a guide member for the seed being directed outwardly into discharge spout 12 by metering wheels 8, and cooperates therewith to define a seed metering passage 13, the shape of which is best shown in FIGURE 4. As will be noted with reference to FIGURE 4, curved bottom wall 11 of cups 6 is so shaped, and wheel 8 is spaced therefrom in such a way that metering passage 13 converges outwardly towards raised discharge lip 22.

Figure 5:
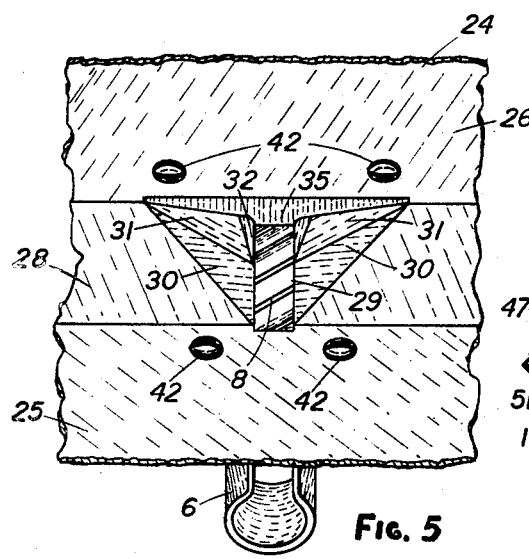
FIGURE 5 is a top view of the discharge trough, metering wheel and guide cup.

As a means for supporting metering assemblies 4 along the bottom of seed hopper 1, and for the purpose of directing seed or other granular material thereinto, I provide a trough generally indicated by reference numeral 24 in FIGURES 3 through 6. Trough 24 is comprised of downwardly and inwardly converging side walls 25 and 26 which taper inwardly at the same angle as side walls 3 and 5 of hopper 1, to which they are detachably secured by fasteners 27. Front and rear side walls 25 and 26 respectively of trough 24 terminate at their lower ends in a substantially horizontal bottom wall 28. A series of spaced apertures 29 are provided in bottom wall 28, so as to provide one seed outlet for each row being planted. As is best shown in FIGURES 4 and 5, each of the seed outlets 29 is defined by oppositely disposed baffle sections 30, 31, and 32 and by rear baffle section 35 at the bottom of wall 26. Baffle sections 30, 31, and 32 are inclined rearwardly and downwardly towards rear trough wall 26 so as to direct seed to the rear of feed wheels 8 into the space at the rear thereof which opens downwardly into the inlet of metering passage 13 defined by outwardly flaring wall sections 34, and rearwardly extending wall 36 of guide cups 6. Baffle segments 30, 31, and 32 are contoured to conform to complementary, inclined wall segments of guide cups 6, only two of which are shown at 38 and 39 in FIGURE 2. Rearwardly diverging side edges 40 of cups 6 conform generally to the side edges of baffle sections 30, with the outwardly inclined wall sections of cups 6 (as shown at 38 and 39) underlying and overlapping the corresponding baffle segments 30, 31, and 32 of trough outlets 29. Cups 6 are removably secured in this position by means of suitable fasteners 42 which attach cup ears 43 to trough front wall 25 and cup rear walls 36 to trough rear wall 26. With guide cups 6 assembled to trough 24 in the manner shown, feed wheels 8 will extend upwardly through seed outlets 29 into trough 24 as is indicated in FIGURE 4. Wheels 8 are confined between guide cup side walls 7 and 9, and are shielded in front by a curved baffle 44 which extends between side walls 7 and 9.

Figure 3:
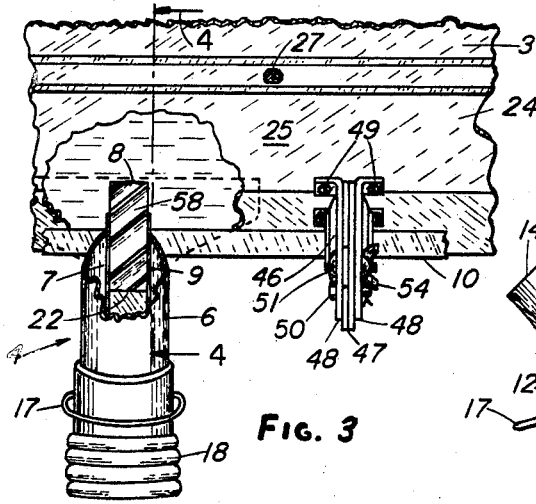
FIGURE 3 is a front elevation view of a seed or grain hopper showing my discharge trough and distributing apparatus attached thereto.

After trough 24 and guide cups 6 have been assembled to hopper 1 in the aforesaid manner, discharge spout 12 may be connected to flexible conduits 18 by means of split rings 17 in the manner shown in FIGURES 3 and 4.

Figure 6:
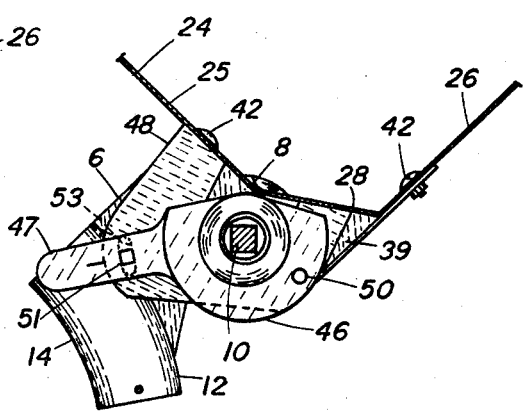
FIGURE 6 is an end view of the apparatus of FIGURE 5.

Square drive shaft 10 on which wheels 8 are mounted is removably supported within a series of spaced apart bearings 46 held within brackets 48 attached to front trough wall 25 by fasteners 49. As is best shown in FIGURES 3 and 6, each bearing 46 is free to pivot within brackets 48 on a pivot pin 50 which extends therethrough. A forwardly extending adjusting arm 47 on each bearing 46 is held in place between brackets 48 by a suitable threaded fastener 51 extending through slots 53 therein. Fastener 51 is free to move up and down within slot 53 and has a wing nut 54 attached to one end thereof. By loosening wing nut 54, bracket arm 47 may be moved up and down so as to swing bearing 46, and drive shaft 10 extending therethrough, about pivot pin 50. Drive shaft 10 may thus be adjusted to a preselected position relative to curved bottom wall 11 of guide cups 6, whereby wheels 8 will be moved up or down relative to wall 11 to increase or decrease the size of convergent, metering passage 13. The operator is thus able to regulate the size of metering passage 13 so as to obtain the desired discharge pattern for the size and type of seeds that are being planted.

In order that the feeding mechanism may be further modified to accommodate the particular type of seeds being planted, feed wheels 8 may be very easily removed and replaced with other wheels having a different type and shape of seed-conveying contour. This can be accomplished by sliding drive shaft 10 lengthwise out of wheels 8 and bearings 46, and then removing wheels 8 upwardly out of cups 6 through seed outlets 29 and the top of trough 24. Seed outlets 29 are sized and shaped so as to permit wheels 8 to be pulled upwardly therethrough. Wheels 8 are preferably molded from resilient material, and are provided with circumferentially spaced grooves or pockets in their periphery which serve as seed-conveying devices. Three types of interchangeable feed wheels are shown in FIGURES 7 through 9. Wheel 8A in FIGURE 7 has a plurality of closely spaced teeth 56A formed around its periphery, these teeth serving to define substantially V-shaped seed-conveying pockets or grooves 58A. Teeth 56A are formed at an angle to the axis of rotation of wheel 8A in a generally helical or spiral configuration. The relatively small, closely spaced pockets 58A on wheel 8A are designed to properly distribute fine seeds such as mustard seed or flax. Wheel 8B in FIGURE 8 is quite similar to wheel 8A, except that its helical teeth 56B are more widely spaced and are contoured to provide generally U-shaped pockets in which larger seeds such as barley, oats or rye may be discharged in the desired pattern into spout 12 from through 24. Resilient teeth 56A and 56B on wheels 56A and 56B are sufficiently compressible as to avoid their crushing seeds against curved bottom wall 11 of guide cup 6 as they rotate in sealing contact therewith. The paddle wheel 8C shown in FIGURE 9 is designed for feeding relatively coarse seeds such as kidney beans or beets. In order to prevent the relatively large paddle wheel teeth 56C of wheel 8C from crushing or otherwise damaging or cracking the seeds as it propels them against curved bottom wall 11 of guide cup 6, wheel 8C is made of relatively flexible and resilient material such as rubber, whereby teeth 56C may flex and bend to allow them to conform to the shape of the seeds as they push the seeds against bottom wall 11. The three types of feed wheels shown in FIGURES 7 through 9 are of course illustrative only. The shape, size, configuration and pitch of the teeth in the feed wheels may be varied to properly distribute any type of seed.

In operation, the type of feed wheel to be installed is first determined on the basis of the particular seed being planted. A plurality of feed wheels 8 are then assembled within guide cups 6 by pulling drive shaft 10 out of bearings 46, removing the previously installed feed wheels upwardly through the top of trough 24, and inserting the desired feed wheels 8 in place within guide cups 6. Drive shaft 10 is then reinserted through bearings 46 and feed wheels 8. Drive shaft 10 is rotated in a clockwise direction as indicated by the directional arrows in FIGURE 4 by a variable speed drive which is powered by a ground wheel or wheels as the grain drill of the type shown in FIGURE 1 traverses the ground. Since the drive arrangement for shaft 10 is a conventional type of ground wheel drive and forms no part of the present invention, it has not been shown. Thus, the application of seed is controlled by the rotational speed of drive shaft 10, which is directly proportional to the ground speed of the grain or seed drill. Once the grain drill is put into motion, rotating feed wheels 8 will propel seeds out of trough 24, through metering passage 13 and into discharge spout 12, the seeds being continuously directed rearwardly of wheels 8 for introduction into metering passage 13 by rearwardly inclined seed apertures 29. The feed wheel 8 shown in FIGURES 2 through 5 is of the type shown in FIGURE 8 having helical teeth 56 forming seed pockets or grooves 58 therebetween for conveying medium-size seeds from hopper 1. As appears most clearly in FIGURE 2, the rotation of wheel 8 will cause seeds to be captured within pockets 58 and conveyed towards discharge spout 12 along bottom wall 11 of metering passage 13 as teeth 56 pass in substantial sealing contact therewith. The seeds will be conveyed forwardly within pockets 58 and evenly distributed over raised lip 22 into discharge spout 12. The arrangement of teeth 56 in a helical pattern on feed wheels 8 provides a particular advantage which may be most readily understood with reference to FIGURE 3. As may be seen in that figure, when one of the seed-conveying pockets 58 is nearly completely exposed above discharge lip 22 with the seed carried in its having been nearly completely deposited into discharge spout 12, the following groove or pocket 58 will have started to expose itself and deposit its seed into tube 12. Thus, there will be no interruption in the distribution of seeds from spaced carrying pockets 58, and seeds will be discharged in a steady, even stream into spout 12 as wheels 8 continue to rotate. This arrangement insures that the seeds in hopper 1 will be dispensed uniformly from each of the rotating feed wheels 8 in continuous streams and spaced evenly on the ground in adjacent furrows as they drop downwardly through flexible conduits 18 attached to discharge spouts 12. The pivotal adjustment of bearings 46 about pivot pins 50 in the manner described above permits feed wheels 8 to be moved up or down within guide cups 6, thus controlling and adjusting the space within metering passage 13 between the bottom of feed wheels 8 and curved bottom wall 11 of guide cups 6. By so adjusting the size of metering passage 13, the distribution of the seed from hopper 1 may be precisely controlled, and clearance may be provided within passage 13 for different sizes of seeds to avoid damage to the surface of the seeds.

Coarse feed wheel 8C as shown in FIGURE 9 will discharge only a few, relatively large seeds at a time as its straight teeth 56C rotate by discharge lip 22. Paddle wheel 8C will produce a substantially uniform flow of seeds out of hopper 1, and is intended for planting coarse seeds such as corn where greater spacing between plants is required and it is not necessary to dispense seeds in such a continuous stream as may be accomplished by helical wheels 8A and 8B of FIGURES 7 and 8.

Those skilled in the art will readily appreciate that the unique cooperative arrangement of feed wheels 8 with guide cups 6, and the adjustment of metering passage 13 formed therebetween, achieves the advantageous dispensing of seed at a continuous, even rate into ground furrows with great uniformity of concentration and evenness of the planted seeds in each furrow, as well as in adjacent furrows. The precision distribution of seeds by my metering mechanism is further enhanced by the interchangeable feed wheel feature which permits the selection and use of a feed wheel having seed-conveying pockets specially sized and shaped for the particular seed being planted.

I contemplate that various changes may be made in the form, detail, arrangement and proportions of the parts of my improved seed dispensing apparatus without departing from the spirit and scope of my invention.

What I claim is:

1. A seed distributing device comprising:
an elongated trough adapted to be secured to the bottom of a seed hopper, said trough being defined by side walls which intersect a bottom wall;
a plurality of spaced-apart discharge apertures in said bottom wall;
a plurality of seed guide cups communicating with each of said discharge apertures, each of said guide cups having curvilinear bottom walls;
a plurality of feed wheels mounted on a rotatably supported drive shaft extending substantially longitudinally with respect to said trough, each of said feed wheels being disposed adjacent to one of said discharge apertures within one of said guide cups and cooperating with said curvilinear bottom walls to define therewith a plurality of seed-metering passages;
means adjustably supporting said drive shaft to permit the movement thereof towards and away from said curvilinear bottom walls of said guide cups to thereby change the spacing of said feed wheels therefrom whereby the size of said metering passages may be varied to accommodate different sizes and types of seeds.

2. A seed distributing device as defined in claim 1, wherein:
said adjustable mounting means comprises a plurality of spaced apart bearings adjustably supported by brackets secured to said trough, each of said bearings being pivotally supported on a pin positioned eccentrically with respect to said drive shaft.

3. A seed distributing device as defined in claim 1, wherein:
said seed discharge apertures are so sized and shaped that said feed wheels may be removed upwardly therethrough;
each of said feed wheels has a plurality of seed-conveying pockets around its periphery, and is removably mounted on said drive shaft; and
said drive shaft is removably journaled outside of said trough within bearings secured thereto, whereby said shaft may be conveniently pulled out of said wheels and said wheels removed through said discharge apertures for replacement by other wheels having different sizes of seed-conveying pockets, whereby said seed distributing device may be readily modified to apply different sizes and types of seeds.

4. Apparatus for dispensing seed from a discharge aperture in the bottom of a grain hopper comprising:
a guide cup attached to said hopper and communicating with said discharge aperture, said guide cup being defined by spaced-apart side walls and a curvilinear bottom wall lying under said discharge aperture and terminating at a raised discharge lip;
a feed wheel rotatably supported within said guide cup, said wheel having a plurality of circumferentially spaced seed-conveying pockets defined by resilient, helical teeth extending across the peripheral surface thereof at an angle with respect to the rotational axis of said wheel, and said wheel cooperating with said curvilinear bottom wall to define therewith a seed-metering passage which converges towards said discharge lip, said lip being disposed above the bottom of said wheel; and wherein:
said guide cup includes a downwardly facing seed outlet communicating with a downwardly extending discharge spout, and wherein said side walls of said guide cups terminate at their forward ends in a tubular member extending upwardly from said seed outlet and defining an upwardly opening passageway which communicates with said outlet, and into which granular conditioning material may be directed for mixing with the seeds being planted.

References Cited

UNITED STATES PATENTS

| | | | |
|---|---|---|---|
| 237,001 | 1/1881 | Elam et al. | 171—66 |
| 416,385 | 12/1889 | Waterman | 111—77 |
| 454,216 | 6/1891 | Keeler. | |
| 484,630 | 10/1892 | Crane | 222—274 X |
| 488,239 | 12/1892 | Cayton | 111—77 |
| 936,883 | 10/1909 | Garwood | 111—77 |
| 1,097,426 | 5/1914 | Gunter et al. | 111—77 |
| 1,322,705 | 11/1919 | Locke | 222—312 X |
| 2,432,437 | 12/1947 | Murphy | 222—274 X |
| 2,569,421 | 9/1951 | Larson. | |
| 2,593,516 | 4/1952 | Alley et al. | 222—312 X |
| 3,120,965 | 2/1964 | MacDonald | 111—80 |
| 3,373,705 | 3/1968 | Hansen et al. | 111—73 |

ROBERT E. BAGWILL, Primary Examiner

ALAN E. KOPECKI, Assistant Examiner

U.S. Cl. X.R.

111—36, 73; 222—315, 274, 269, 145